US011912126B2

(12) United States Patent
Yoshida et al.

(10) Patent No.: US 11,912,126 B2
(45) Date of Patent: *Feb. 27, 2024

(54) ACCELERATOR PEDAL SYSTEM

(71) Applicant: DENSO CORPORATION, Kariya (JP)

(72) Inventors: Yuusuke Yoshida, Kariya (JP); Soichi Kinouchi, Kariya (JP); Takuto Kita, Kariya (JP); Hideyuki Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,668

(22) Filed: Aug. 23, 2022

(65) Prior Publication Data

US 2023/0065672 A1 Mar. 2, 2023

(30) Foreign Application Priority Data

Aug. 25, 2021 (JP) ................. 2021-137326

(51) Int. Cl.
*G05G 1/30* (2008.04)
*B60K 26/02* (2006.01)
(Continued)

(52) U.S. Cl.
CPC ............ *B60K 26/02* (2013.01); *B60K 26/021* (2013.01); *G05G 5/005* (2013.01); *G05G 5/03* (2013.01);
(Continued)

(58) Field of Classification Search
CPC .................. B60K 26/02; B60K 26/021; B60K 2026/023; B60K 2026/022;
(Continued)

(56) References Cited

U.S. PATENT DOCUMENTS 7,706,953 B1 * 4/2010 Sun ................... B60W 30/143
340/441
2013/0261889 A1 * 10/2013 Sekine ................ B60W 50/085
701/93

(Continued)

FOREIGN PATENT DOCUMENTS

EP 2196348 A1 * 6/2010 ........... B60K 26/021
JP 2000-54860 2/2000

OTHER PUBLICATIONS

Machine Translation of EP-2196348-A1.*
(Continued)

*Primary Examiner* — Daniel D Yabut
*Assistant Examiner* — Brian J McGovern
(74) *Attorney, Agent, or Firm* — Nixon & Vanderhye P.C.

(57) ABSTRACT

An accelerator pedal system includes a pedal lever, a lock mechanism, an actuator, and an ECU. The lock mechanism can restrict the operation of the pedal lever. The actuator switches between a locked state in which the operation of the pedal lever is restricted by the lock mechanism and an unlocked state in which the operation of the pedal lever is not restricted. The ECU includes a lock operation determination unit and an actuator control unit. The lock operation determination unit resumes the locked state by the drive of the actuator after a release from the locked state due to the step-on operation of the pedal lever during the automatic drive control in the locked state, when (i) the automatic drive control is continued or (ii) a resuming of the automatic drive control is detected.

6 Claims, 5 Drawing Sheets

(51) Int. Cl.
*G05G 5/00* (2006.01)
*G05G 5/03* (2008.04)
*B60W 60/00* (2020.01)

(52) U.S. Cl.
CPC ....... *B60W 60/005* (2020.02); *B60W 2540/10* (2013.01); *G05G 1/30* (2013.01)

(58) Field of Classification Search
CPC ...... B60K 2026/026; G05G 1/30; G05G 1/40; G05G 1/405; G05G 1/38; G05G 1/44; G05G 5/005; G05G 5/03; G05G 5/05; G05G 5/28; B60W 2540/10; B60W 30/143
See application file for complete search history.

(56) References Cited

U.S. PATENT DOCUMENTS

| | | | |
|---|---|---|---|
| 2017/0217312 A1* | 8/2017 | Schweinfurth | F02D 11/02 |
| 2019/0322172 A1* | 10/2019 | O Meachair | B60W 30/143 |
| 2020/0257329 A1 | 8/2020 | Kihara et al. | |

OTHER PUBLICATIONS

"Linear Actuator," Wikipedia Page, dated by Wayback Machine to Jun. 5, 2020, url :<https://web.archive.org/web/20200605003015/https://en.wikipedia.org/wiki/Linear_actuator>.*

"Trapezoidal Thread Form," Wikipedia Page, dated by Wayback Machine to Mar. 31, 2019, url: <https://web.archive.org/web/20190331184607/https://en.wikipedia.org/wiki/Trapezoidal_thread_form>.*

U.S. Appl. No. 17/893,637 to Yuusuke Yoshida, filed Aug. 23, 2022 (34 pages).
U.S. Appl. No. 17/893,618 to Yuusuke Yoshida, filed Aug. 23, 2022 (25 pages).
U.S. Appl. No. 17/893,700 to Soichi Kinouchi, filed Aug. 23, 2022 (24 pages).
U.S. Appl. No. 17/893,752 to Soichi Kinouchi, filed Aug. 23, 2022 (22 pages).
U.S. Appl. No. 17/893,801 to Soichi Kinouchi, filed Aug. 23, 2022 (25 pages).
U.S. Appl. No. 17/893,842 to Soichi Kinouchi, filed Aug. 23, 2022 (33 pages).
U.S. Appl. No. 17/893,883 to Soichi Kinouchi, filed Aug. 23, 2022 (28 pages).

* cited by examiner

ACCELERATOR PEDAL SYSTEM

CROSS REFERENCE TO RELATED APPLICATION

The present application is based on and claims the benefit of priority of Japanese Patent Application No. 2021-137326, filed on Aug. 25, 2021, the disclosure of which is incorporated herein by reference.

TECHNICAL FIELD

The present disclosure generally relates to an accelerator pedal system.

BACKGROUND

Conventionally, an automatic driving control device that automatically performs an automatic travel control of a vehicle without requiring an operation by a driver is known. For example, in case of having an automatic driving control, an accelerator pedal reaction force adjuster is set to an ON state, and an accelerator pedal is held by an accelerator pedal stopper.

In this case, the automatic travel control is started and stopped in response to an operation of a cruise control switch, and the accelerator pedal reaction force adjuster is controlled accordingly. However, when the start or stop of the automatic travel control is switched by a switch operation, the switch operation may bother the driver and may become an operation load of the driver.

SUMMARY

It is an object of the present disclosure to provide an accelerator pedal system capable of appropriately controlling a locked state of a pedal lever.

An accelerator pedal system according to an aspect of the present disclosure includes a pedal lever, a lock mechanism, an actuator, and a controller. The pedal lever operates according to a step-on operation. The lock mechanism can restrict the operation of the pedal lever. The actuator switches between a locked state in which the operation of the pedal lever is restricted by the lock mechanism and an unlocked state in which the operation of the pedal lever is not restricted.

The controller may include a lock operation determination unit and an actuator control unit. The lock operation determination unit determines switching of the lock operation by the lock mechanism. The actuator control unit controls the drive of the actuator. The lock operation determination unit resumes the locked state by the drive of the actuator after the locked state is released due to the step-on operation of the pedal lever during an automatic drive control in the locked state, when (i) the automatic drive control is continued or (ii) a resuming of the automatic drive control is detected. Thus, it is possible to appropriately control the locked state of the pedal lever.

BRIEF DESCRIPTION OF THE DRAWINGS

The above and other objects, features and advantages of the present disclosure will become more apparent from the following detailed description made with reference to the accompanying drawings. In the drawings.

DESCRIPTION OF EMBODIMENTS

Figure 1:
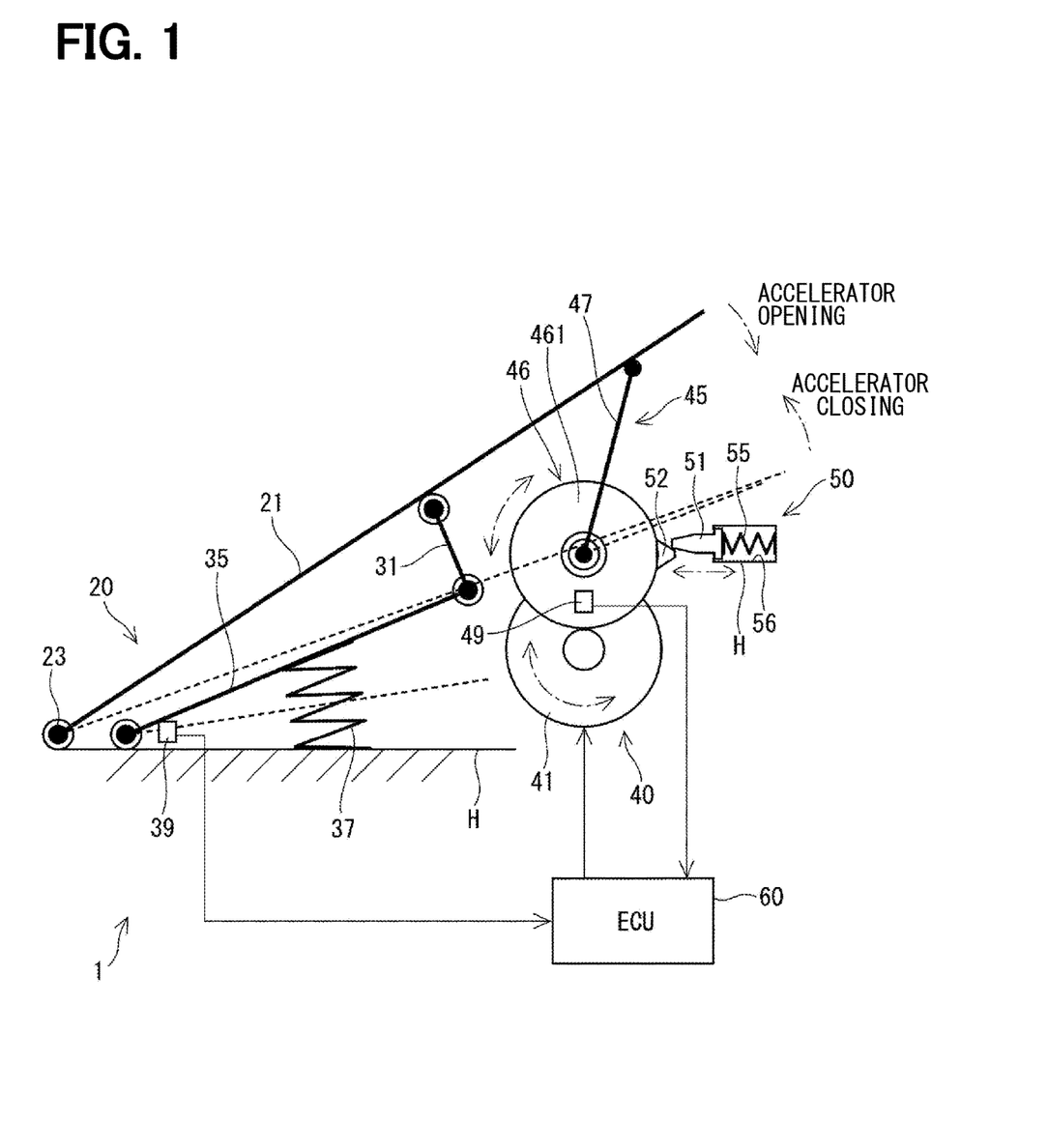
FIG. 1 is a schematic diagram illustrating an accelerator pedal system according to an embodiment.

Hereinafter, an accelerator pedal system according to the present disclosure will be described with reference to the drawings. An embodiment is illustrated in FIGS. 1 to 5. As illustrated in FIG. 1, an accelerator pedal system 1 includes a pedal lever 20, an actuator 40, a power transmission mechanism 45, a lock mechanism 50, an electronic control unit (ECU) 60 serving as a controller, and the like.

The pedal lever 20 includes a pad 21, an arm 31, and a pedal 35, and is integrally driven by a driver's step-on operation or the like. The pad 21 is provided operable by a driver's step-on operation. The pad 21 is rotatably supported by a fulcrum member 23 provided on a housing H. FIG. 1 illustrates a so-called floor type (organ type) pedal in which the pad 21 is provided to extend in a direction along one surface of the housing H. However, a suspension type (pendant type) pedal may be used. In the present embodiment, the housing portions such as a pedal housing and a motor housing that are not driven by driving of a motor 41 or a step-on operation of the pedal lever 20 are collectively referred to as a "housing H".

The arm 31 couples between the pad 21 and the pedal 35. One end of the pedal 35 is rotatably supported by the housing H, and the other end is connected to the arm 31. With this arrangement, the pad 21, the arm 31, and the pedal 35 are integrally driven by an operation of the pad 21 by the driver. A pedal opening degree sensor 39 that detects a pedal opening degree $\theta$ is provided on one end side of the pedal 35.

Figure 2:
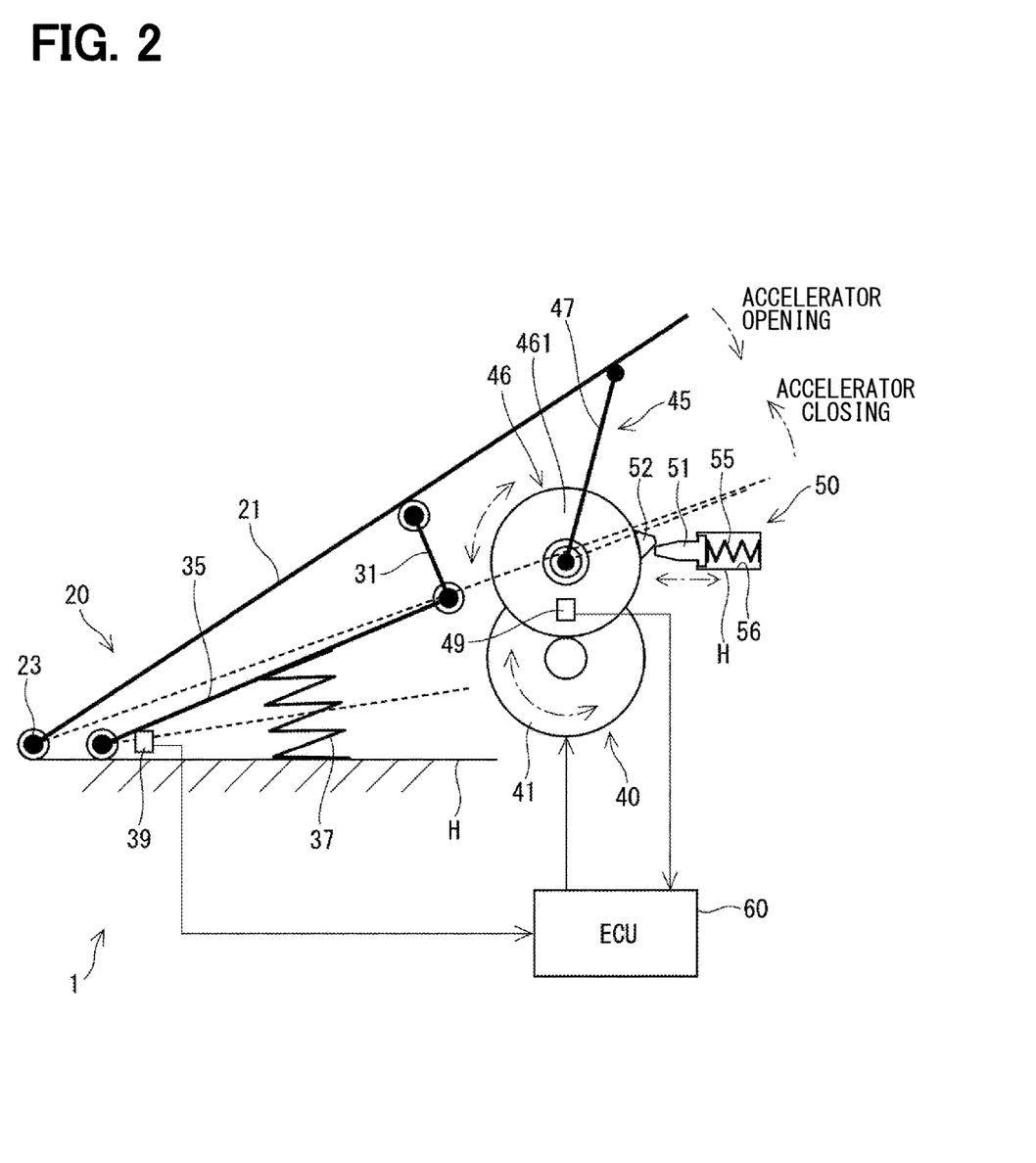
FIG. 2 is a schematic diagram illustrating a state where a pedal lever is locked in the accelerator pedal system according to the embodiment.

A pedal biasing member 37 is a compression coil spring and biases the pedal 35 in an accelerator closing direction, with one end fixed to the pedal 35 and the other end fixed to the housing H. In FIGS. 1 and 2, the solid lines depict a state of fully closed acceleration, and the broken lines depict a state of fully opened acceleration.

The actuator 40 includes the motor 41 and a power transmission mechanism 45. The motor 41 is, for example, a DC motor, and driving of the motor 41 is controlled by the ECU 60. The driving force of the motor 41 is transmitted to the pedal lever 20 via the power transmission mechanism 45. It can be said that the actuator 40 is a series of components that transmits power from the motor 41 as a drive source to the pedal lever 20 via the power transmission mechanism 45.

The power transmission mechanism 45 includes a gear set 46, a power transmission member 47, and the like. The gear set 46 is configured with: a motor gear that rotates integrally with a motor shaft; and a plurality of gears that mesh with the motor gear, and the gear set 46 transmits the driving force of the motor 41 to the power transmission member 47. The gear set 46 includes a gear 461 that is provided with a locked portion 52 to be locked as described later. The gear 461 is provided with a position sensor 49 that detects a rotational position. Hereinafter, the rotational directions of the motor 41, the gear 461, and the like when the gear 461 is rotated counterclockwise on the paper surface are defined as positive, and the rotational directions of the motor 41, the gear 461, and the like when the gear 461 is rotated clockwise on the paper surface are defined as negative.

The power transmission member 47 is, for example, a cam, and one end side of the power transmission member 47 meshes with the gear set 46, so that the power transmission member 47 is rotationally driven by driving of the motor 41. The other end side of the power transmission member 47 is in contact with the pedal lever 20. With this arrangement, the driving force of the motor 41 is transmitted to the pedal lever 20. In FIG. 1, the other end of the power transmission member 47 is in contact with the pad 21, but may be in contact with the arm 31 or the pedal 35.

By rotating the motor 41 in the positive direction in a state where the power transmission member 47 and the pedal lever 20 are in contact with each other, it is possible to apply a reaction force in a push-back direction to the pedal lever 20. In addition, when no reaction force is applied to the pedal lever 20, it is desirable to rotate the motor 41 in the negative direction and thereby to retract the power transmission member 47 so that the pedal lever 20 and the power transmission member 47 will not be in contact with each other in the entire range from the fully closed state to the fully opened state of the pedal lever 20. Therefore, when no reaction force is applied, it is possible to prevent a cogging torque or the like from the power transmission mechanism 45 side from affecting a pedaling force.

By applying a reaction force in the push-back direction to the pedal lever 20 by the motor 41, for example, by applying a reaction force to provide a sense of wall when a fuel consumption is determined, on the basis of the driving situation, to be deteriorated if the pad 21 is stepped on, the stepping on of the pad 21 by the driver is prevented or reduced. Accordingly, a fuel efficiency can be improved. Further, for example, by pulse-driving the pedal lever 20 in the push-back direction, the pulse-driving can be used to transmit information such as notification of switching from automatic driving to manual driving.

The lock mechanism 50 includes a locking member 51, a locked portion 52 to be locked, a resilient member 55, and the like. The locking member 51 has a tapered surface formed on one end side of the locking member 51 and is disposed such that the tapered surface is in contact with the locked portion 52. The other end side of the locking member 51 is accommodated in an accommodation chamber 56 formed on the housing H and is provided to be reciprocally movable in the axial direction. The locked portion 52 is provided to protrude from the gear 461 constituting the gear set 46, and rotates integrally with the gear 461. The locked portion 52 comes into contact with the locking member 51 on the tapered surface.

The resilient member 55 is accommodated in the accommodation chamber 56 provided on the housing H. One end of the resilient member 55 is in contact with the locking member 51, and the other end is engaged with the housing H, whereby the resilient member 55 biases the locking member 51 toward the locked portion 52.

FIG. 1 illustrates a state when locking is just started. When the gear 461 is rotated counterclockwise on the paper surface by the driving force of the motor 41 in a state where the locked portion 52 and the locking member 51 are in contact with each other, the locked portion 52 pushes the locking member 51 and thereby compresses the resilient member 55. When the gear 461 is further rotated counterclockwise and the locked portion 52 goes over and gets around the locking member 51 to the upper side on the paper surface, the locking member 51 returns to an initial position by the biasing force of the resilient member 55.

As illustrated in FIG. 2, in a locked state, since the locking member 51 latches the locked portion 52 by the biasing force of the resilient member 55, the rotation of the gear 461 is restricted. In addition, the power transmission member 47 functions as a locking force transmission member, so that the operation of the pedal lever 20 is restricted. As a result, the operation of the pedal lever 20 can be restricted in a non-energized state in which the energization of the motor 41 is turned off.

Hereinafter, to restrict the operation of the pedal lever 20 is simply referred to as "to lock". For example, during automatic driving or the like, it is possible to secure comfort by locking the pedal lever 20 and by thus making the pad 21 function as a footrest. In the present embodiment, the description is given, assuming that the pedal lever 20 is locked at a fully-closed position.

When the gear 461 is rotated clockwise on the paper surface from the locked state illustrated in FIG. 2 by the driving force of the motor 41, the locked portion 52 pushes the locking member 51, so that the resilient member 55 is compressed. When the locked portion 52 goes over and gets around the locking member 51 to the lower side on the paper surface, the locked state is released, so that the locking member 51 returns to the initial position by the biasing force of the resilient member 55. Also, when a predetermined pedal force or more pedaling force is applied to the pedal lever 20, the locked state can be similarly released.

When the pedal lever 20 is kept unlocked, it is desirable to further rotate the gear 461 clockwise from the state illustrated in FIG. 1 to retract the locked portion 52 so that the locking member 51 and the locked portion 52 will not come into contact with each other.

Figure 3:
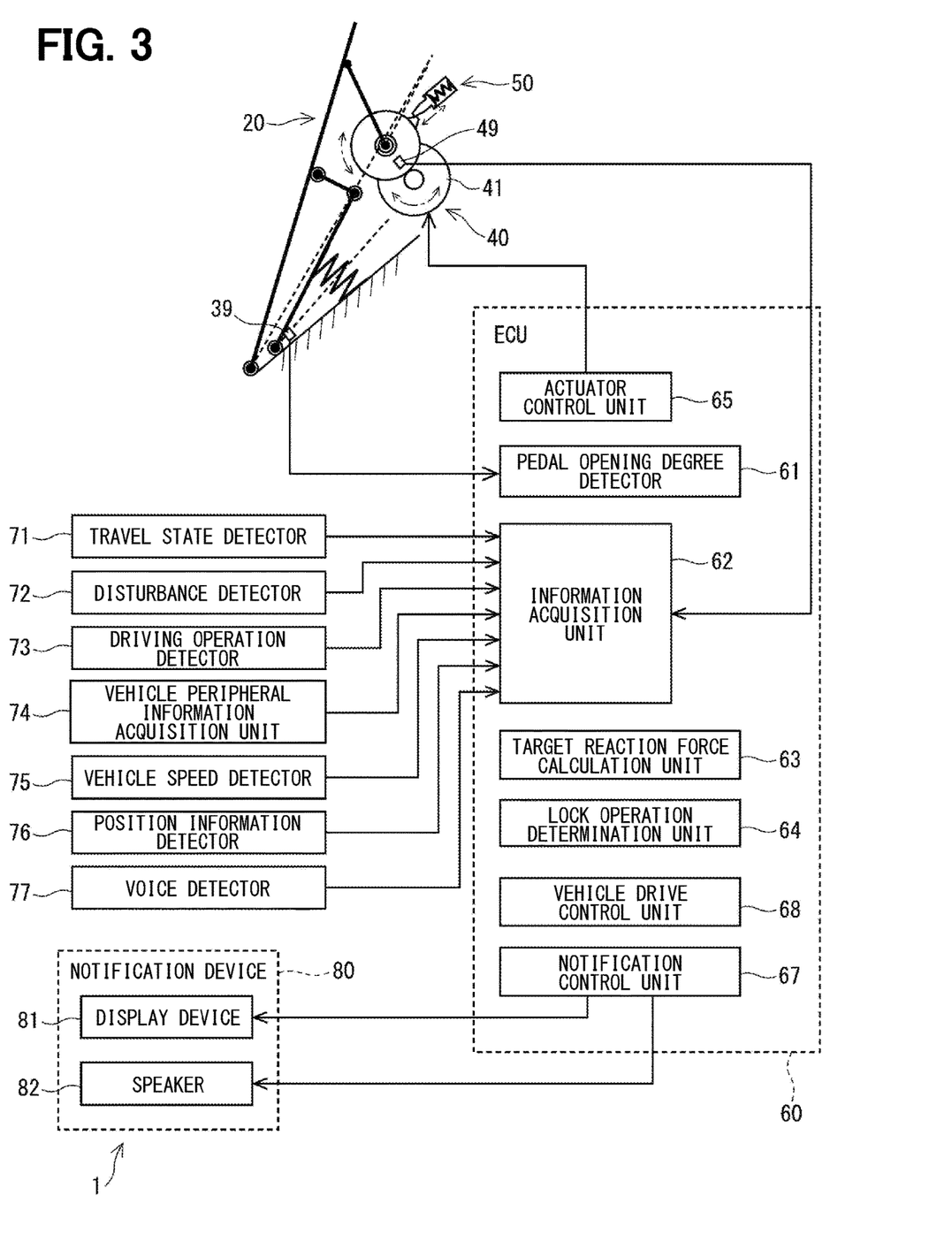
FIG. 3 is a block diagram illustrating a control configuration of the accelerator pedal system according to the embodiment.

As illustrated in FIG. 3, the ECU 60 is mainly configured with a microcomputer or the like, and includes therein: a central processing unit (CPU), a read-only memory (ROM), a random-access memory (RAM), an input/output interface (I/O), which are all not illustrated; a bus line that connects these components; and other components. Processes in the ECU 60 may be realized by software processing that is performed by the CPU executing a program previously stored in a physical memory device such as a ROM or the like (that is, a readable non-transitory tangible recording medium), and the processes may be realized by hardware processing performed by a dedicated electronic circuit.

The ECU 60 includes, as functional blocks: a pedal opening degree detector 61; an information acquisition unit 62; a target reaction force calculation unit 63; a lock operation determination unit 64; an actuator control unit 65; a notification control unit 67; a vehicle drive control unit 68; and the like. Although the ECU 60 is depicted as a single ECU 60 in FIG. 3, some of the functions may be configured with a separate ECU or the like.

The pedal opening degree detector 61 detects the pedal opening degree θ on the basis of a detection value of the pedal opening degree sensor 39. The information acquisition unit 62 acquires various types of information from the following components: the position sensor 49, a travel state detector 71, a disturbance detector 72, a driving operation detector 73, a vehicle peripheral information acquisition unit 74, a vehicle speed detector 75, a position information detector 76, a voice detector 77, and the like.

The target reaction force calculation unit 63 calculates a target reaction force to be applied to the pedal lever 20. On the basis of various types of information acquired by the information acquisition unit 62, the lock operation determination unit 64 makes a determination related to switching between a locked state in which the pedal lever 20 is locked and an unlocked state in which the pedal lever 20 is not locked. Hereinafter, as appropriate, switching from the unlocked state to the locked state is referred to as "lock activation", and switching from the locked state to the unlocked state is referred to as "lock releasing". The actuator control unit 65 controls driving of the motor 41 on the basis of the target reaction force, a determination result of the lock operation determination unit 64, and the like.

The notification control unit 67 notifies a notification device 80 of information that the driver is to be notified of. In the present embodiment, information related to lock activation and lock releasing of the pedal lever 20 is notified of. The vehicle drive control unit 68 controls driving of the vehicle.

The travel state detector 71 detects a driving mode as a traveling state. The driving mode includes an override mode in addition to an automatic driving mode and a manual driving mode. The control in the automatic driving mode is a cruise control such as an adaptive cruise control (ACC), but details of the control does not matter. In the override mode, both an input from the control by the automatic driving and a step-on input from the driver are input, and the input by the step-on operation of the driver is always prioritized in the override mode.

The disturbance detector 72 detects a disturbance on the basis of information of a G sensor that detects acceleration, a suspension behavior detection device, an indoor camera, and the like. The disturbance includes, for example, a vehicle deceleration G caused by a relatively rapid deceleration, a vehicle vibration caused by a stepped road surface and the like. Further, the disturbance may include non-driving-operation motions that are motions other than normal driving motions, for example, reseating of the driver, wearing and removing the seat belt, picking up a fallen object, stretching, and a driver's state of consciousness.

The driving operation detector 73 detects a turn signal operation and a steering wheel manipulation by the driver. The vehicle peripheral information acquisition unit 74 detects oncoming other vehicles, obstacles, and the like by road-to-vehicle communication, vehicle-to-vehicle communication, an onboard camera, radar, and the like.

The vehicle speed detector 75 detects a vehicle speed, which is a traveling speed of the vehicle. The vehicle speed detector 75 does not have to use a vehicle speed sensor, and may be configured to detect the vehicle speed by performing calculation using positional data of the global positioning system (GPS). The position information detector 76 detects the current position of the vehicle on the basis of information from map information, the GPS, road-to-vehicle communication, an onboard camera, and the like. The position information detector 76 may use the above-described types of information alone or in combination. In addition, information other than the above-described information may be used.

The voice detector 77 detects a voice emitted by an occupant. The notification device 80 includes: a display device 81, which is a liquid crystal display or the like; and a speaker 82, and notifies the driver of various types of information.

Since the lock mechanism 50 of the present embodiment can hold, or maintain, the locked state of the pedal lever 20 without an electric power supplied, the motor 41 is not energized after locking. That is, the motor 41 is not energized after the locked state is established. Therefore, after the driver presses the pedal lever 20 to release the lock and the driving mode shifts to the override mode, it is necessary to energize the motor 41 for resuming the automatic driving and for locking of the pedal lever 20 again.

Figure 4:
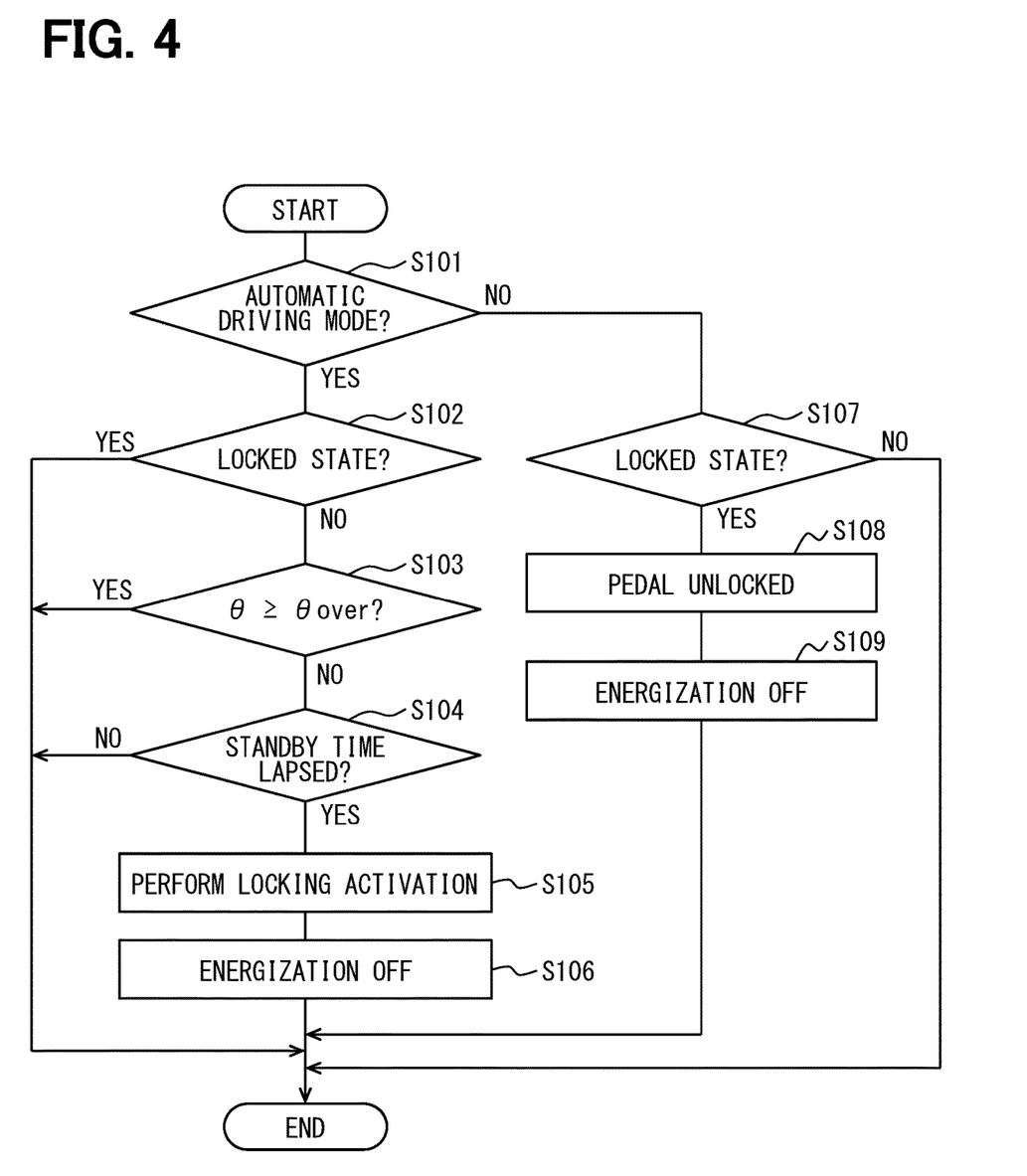
FIG. 4 is a flowchart describing a lock operation control process according to the embodiment.

The lock operation control process of the present embodiment will be described with reference to the flowchart of FIG. 4. This process is performed by the ECU 60 at a predetermined cycle. Hereinafter, "step" in step S101 or the like is omitted, and is simply written as the symbol "S".

In S101, the ECU 60 determines whether the current travel mode is the automatic driving mode. In this step, it is considered that the override mode is not the automatic driving mode. In the override mode, the automatic driving is temporarily canceled by, for example, an operation of the pedal lever 20 or the brake pedal, and an operation by the driver is reflected to the driving. If the driving mode is determined not to be the automatic driving mode (S101: NO), the process proceeds to S107. If the driving mode is determined to be the automatic driving mode (S101: YES), the process proceeds to S102.

In S103, the lock operation determination unit 64 determines whether or not the pedal lever 20 is in the locked state. When it is determined that the pedal lever 20 is in the locked state (S102: YES), the processes of S103 and the following steps are skipped and a pedal locked state is maintained. When it is determined that the pedal lever 20 is not in the locked state (S102: NO), the process proceeds to S103.

In S103, the lock operation determination unit 64 determines whether or not the pedal opening degree θ is equal to or greater than an override start opening degree θover corresponding to an automatic-driving set vehicle speed Va. When it is determined that the pedal opening degree θ is equal to or greater than the override start opening degree θover (S103: YES), the mode shifts to the override mode and the processing of S104 and the following steps is skipped. When it is determined that the pedal opening degree θ is smaller than the override start opening degree θover (S103: NO), the process proceeds to S104.

In S104, the lock operation determination unit 64 determines whether or not the unlocked state in which the pedal lever 20 is unlocked in the automatic driving mode continues at least for a standby time X. The standby time X is set according to a time required for the pedal opening degree θ to reach the override start opening degree θover after the lock is released by the step-on operation of the accelerator pedal by the driver. When it is determined that the standby time X has not elapsed since the unlocked state is set in the automatic driving mode (S104: NO), the processing of S105 and the following step is skipped, and the process stands by in the unlocked state. When it is determined that the unlocked state in the automatic driving mode has continued at least for the standby time X (S104: YES), the process shifts to S105.

In S105, the actuator control unit 65 locks the pedal lever 20 by energizing the motor 41, and, when the locking of the pedal lever 20 is complete, the energization of the motor 41 is turned OFF in S106.

When the ECU 60 determines that the current travel mode is not the automatic driving mode (S101: NO), the process shifts to S107. In S107, the lock operation determination unit 64 determines whether or not the pedal lever 20 is in the locked state. When it is determined that the pedal lever 20 is not in the locked state (S107: NO), the processing of S108 and the following step is skipped, and the unlocked state is maintained. When it is determined that the pedal lever 20 is in the locked state (S107: YES), the process proceeds to S108.

In S108, the actuator control unit 65 unlocks the pedal lever 20 by energizing the motor 41, and, when the unlocking is complete, the actuator control unit 65 turns OFF the energization of the motor 41 in S109.

Figure 5:
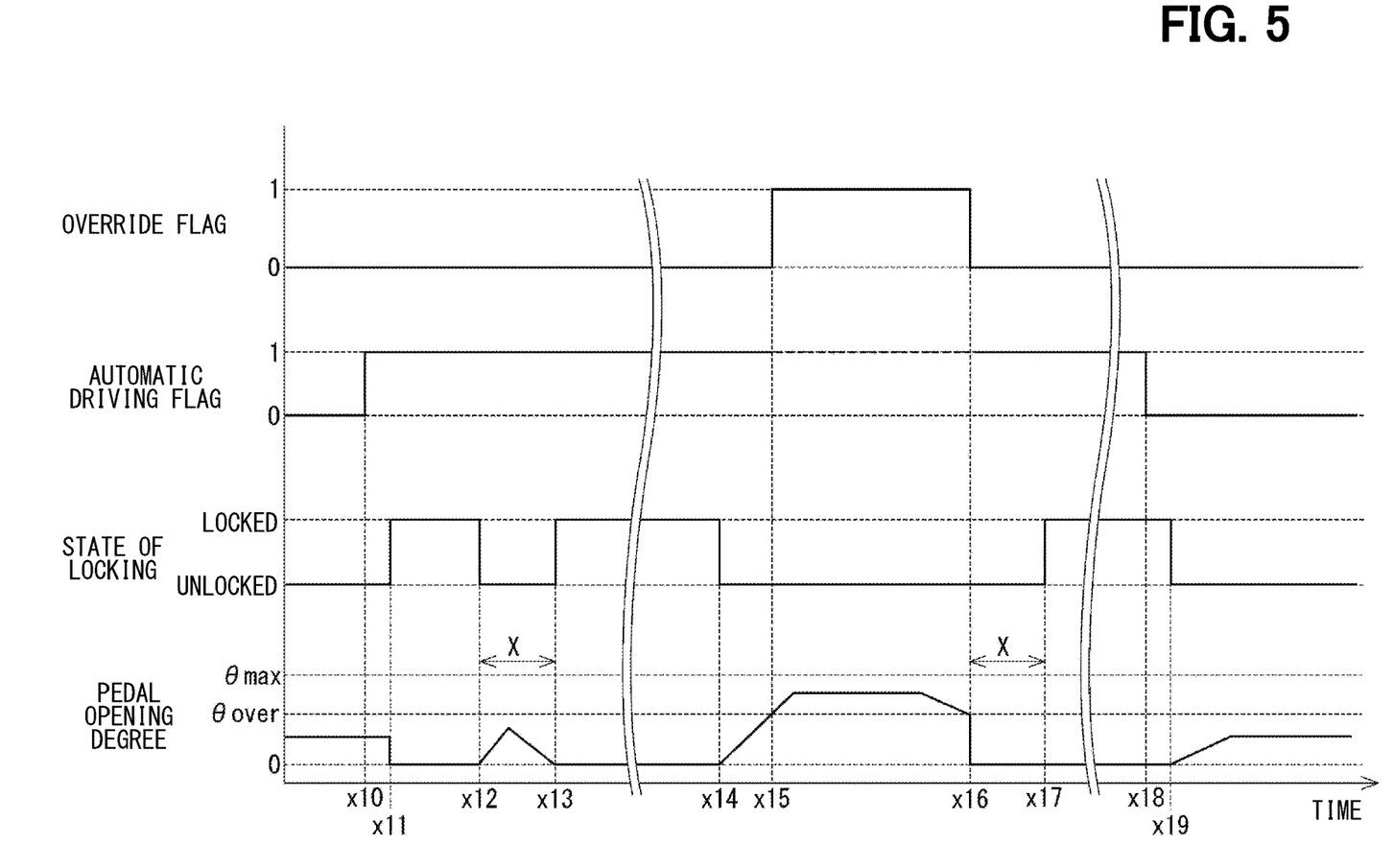
FIG. 5 is a time chart describing the lock operation control process according to the embodiment.

The lock operation control of the present embodiment will be described with reference to the time chart of FIG. 5. In FIG. 5, a common time axis is the horizontal axis, and an override flag, an automatic driving flag, a state of locking of the pedal lever 20, and a pedal opening degree are shown in rows from top to bottom. Regarding the flags, a set state is designated as "1" and a not-set state is designated as "0".

When the automatic driving is started at time x10, the automatic driving flag is set. When the locking of the pedal lever 20 is complete at time x11, the energization to the motor 41 is turned OFF. If the pedal lever 20 is unlocked at time x12, but the pedal opening degree θ is smaller than the override start opening degree θover even after the standby time X has elapsed since the unlocking, it is considered that the unlocking was unintentional. In this case, at time x13 when the standby time X has elapsed, the motor 41 is driven and the pedal lever 20 is locked again. After the locking is complete, the energization to the motor 41 is turned OFF.

When the pedal lever 20 is unlocked at time x14 and the pedal opening degree θ becomes equal to or greater than the override start opening degree θover at time x15 before the standby time X elapses, it can be considered that the driver has an intention to step on the pedal lever 20. In this case, the mode shifts to the override mode without locking the pedal lever 20 again, and the override flag is set.

When the pedaling force applied to the pedal lever 20 by the driver is released at time x16, the pedal opening degree θ becomes smaller than the override start opening degree θover, and the override mode ends. Further, in case that the pedal opening degree θ is monitored, and, when the pedal opening degree θ does not exceed the override start opening degree θover while the standby time X elapses, the motor 41 is driven at time x17, which is after the lapse of the standby time X from time x16, and the pedal lever is locked. When the locking of the pedal lever 20 is complete, the energization to the motor 41 is turned OFF. Further, when resuming the automatic drive control after ending the override mode, the pedal lever 20 may be locked without waiting the lapse of the standby time X.

When the automatic driving is released by stepping on the brake pedal or the like at time x18, the motor 41 is driven to release the lock of the pedal lever 20. At time x19 when the unlocking is complete, the energization to the motor 41 is turned OFF.

As described above, the accelerator pedal system 1 of the present embodiment includes the pedal lever 20, the lock mechanism 50, the actuator 40, and the ECU 60. The pedal lever 20 operates in accordance with a step-on operation. The operation of the pedal lever 20 can be restricted by the lock mechanism 50. Here, the expression "the operation of the pedal lever can be restricted" is not limited to setting the movement amount thereof to 0 by completely fixing the pedal lever 20, but is a concept including setting the movement amount thereof to be smaller than that in the unlocked state. The actuator 40 switches between a locked state in which the operation of the pedal lever 20 is restricted by the lock mechanism 50 and an unlocked state in which the operation is not restricted.

The ECU 60 includes the lock operation determination unit 64, and the actuator control unit 65. The lock operation determination unit 64 determines switching of the lock operation by the lock mechanism 50. The actuator control unit 65 controls drive of the actuator 40 in accordance with the determination result of the lock operation determination unit 64. In the present embodiment, the drive of the motor 41 is mainly controlled.

The lock operation determination unit 64 resumes the locked state by driving the actuator 40, when (i) the automatic drive control is continued or (ii) a resuming of the automatic drive control is detected, after the locked state is released by the step-on operation of the pedal lever 20 during the automatic drive control in the locked state, In such manner, the locked state of the pedal lever 20 can be appropriately controlled. Specifically, (i) when the automatic drive control is continued without the release even after the release of the pedal lever 20 from the locked state, the driver's unintended acceleration is suppressed by relocking the pedal lever 20. Further, the pedal lever 20 can be appropriately re-locked when resuming the automatic driving after ending the override mode.

In the present embodiment, since the no-energized locking is possible, the energization to the motor 41 is turned OFF during the locking. Therefore, the locked state of the pedal lever 20 can be appropriately resumed by setting the energization to the motor 41, when the automatic drive control is continued or resumed after the release from the locked state.

After the release from the locked state, the lock operation determination unit 64 resumes the locked state when a state in which the pedal opening degree θ is smaller than the override start opening degree θover for starting the override mode continues at least for the standby time X. In such manner, it is possible to more appropriately detect that the unlocking (i.e., release from the locked state) was not intended by the driver.

Other Embodiments

In the above-described embodiment, the locking member 51 is provided on a fixed side (i.e., as a stationary member), and the locked portion 52 is provided on a movable side (i.e., as a movable member). In other embodiments, the locking member may be provided on the movable side, and the locked portion may be provided on the fixed side. In the above-described embodiment, the locked portion is formed as a projection/convex component. In other embodiments, the locked portion may be formed as a recess/concave component. One of the locked portion and the locking member does not have to be provided on a spur gear, and may be provided on a member other than the spur gear that constitutes the power transmission mechanism.

In the above embodiments, the locking member is provided to be movable in a linear direction along the axial direction of the resilient member, which is a compression coil spring. In other embodiments, the locked state and the unlocked state may be switched by rotation of the locking member. When the state of locking is switched by rotation of the locking member, it is possible to reduce uneven wear of an abutting portion. In other embodiments, the resilient member does not have to be a compression coil spring, and may be a torsion spring, for example. Alternatively, the locking member itself may be formed of an elastic member such as rubber, and may be elastically deformed to switch the state of locking.

In addition, the power transmission mechanism and the lock mechanism may be different from those in the above embodiments. The shapes of the locking member and the locked portion may be different from those in the above embodiments, depending on component layout or the like. In the above embodiments, a common actuator is used to apply a reaction force to the pedal lever and to perform the lock operation. In other embodiments, an actuator for applying a reaction force and an actuator for performing a lock operation may be separately provided.

In the above embodiments, the lock mechanism can hold the locked state in a no-energized state where energization of the motor is turned OFF. In other embodiments, the lock mechanism may be configured to maintain the locked state by continuously energizing the motor.

In the above embodiments, the pedal lever is locked at a fully-closed position by the lock mechanism. In other embodiments, the pedal lever may be locked at a fully-opened position or may be locked at an intermediate position between the fully-closed position and the fully-opened position. Further, the pedal lever may be configured to be capable of being locked in a stepwise manner via a plurality of steps.

In other embodiments, at least one of the notification to the driver may be provided at least at one of a locking time and an unlocking time. Further, a notification may be performed immediately after the start of automatic driving, and a notification may be not performed at a locking time, i.e., at an override end timing during the automatic driving. That is, the notification regarding the locking and unlocking may be or may be not provided depending on a situation. Further, confirmation of the driver's intention regarding the locking and the unlocking may be performed.

According to an exemplar of the present disclosure, a controller may include at least one processor configured to determine switching of a lock operation by the lock mechanism, and to control a drive of an actuator. The controller may be configured to release a locked state in accordance with a step-on operation of a pedal lever during an automatic drive control in a locked state, and to resume the locked state by the drive of the actuator when (i) the automatic drive control is continued or (ii) a resuming of the automatic drive control is detected after the locked state is released.

A control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the above embodiment, and various modifications may be implemented without departing from the spirit of the present disclosure.

What is claimed is:

1. An accelerator pedal system comprising:
a pedal lever configured to be operable in accordance with a step-on operation;
a lock mechanism configured to be capable of restricting the operation of the pedal lever;
an actuator configured to switch between a locked state in which the operation of the pedal lever is restricted by the lock mechanism and an unlocked state in which the operation of the pedal lever is free from restriction by the lock mechanism; and
a controller including
a lock operation determination unit configured to determine switching of a lock operation by the lock mechanism, and
an actuator control unit configured to control a drive of the actuator,
wherein
the controller is configured to set an automatic driving mode, an override mode in which an input by the step-on operation is always prioritized when both an automatic driving and the step-on operation are input, or a manual mode, as a vehicle driving mode, and
the controller is further configured to:
transition to the locked state in the automatic driving mode,
switch to the override mode when the pedal lever is pressed to release the locked state and transition to the unlocked state, and a pedal opening degree is equal to or larger than an override start opening degree for starting the override mode, and
resume the locked state, when a state in which the pedal opening degree is smaller than the override start opening degree is continued at least for a standby time.

2. The accelerator pedal system according to claim 1, wherein the controller further is configured to:
turn OFF energization to the actuator during the locked state, and
turn ON the energization to the actuator when the automatic drive control is continued or resumed after the release from the locked state.

3. The accelerator pedal system according to claim 1, wherein the lock mechanism includes a locking member movably disposed within an accommodation chamber fixed relative to a pedal housing.

4. An accelerator pedal system comprising:
a pedal lever configured to be operable in accordance with a step-on operation;
a lock mechanism configured to be capable of restricting the operation of the pedal lever;
an actuator configured to switch between a locked state in which the operation of the pedal lever is restricted by the lock mechanism and an unlocked state in which the operation of the pedal lever is free from restriction by the lock mechanism; and
a controller including at least one processor configured to determine switching of a lock operation by the lock mechanism, and to control a drive of the actuator, wherein
the controller is configured to set an automatic driving mode, an override mode in which an input by the step-on operation is always prioritized when both an automatic driving and the step-on operation are input, or a manual mode, as a vehicle driving mode, and
the controller is further configured to:
transition to the locked state in the automatic driving mode,
switch to the override mode when the pedal lever is pressed to release the locked state and transition to the unlocked state, and a pedal opening degree is equal to or larger than an override start opening degree for starting the override mode, and resume the locked state, when a state in which the pedal opening degree is smaller than the override start opening degree is continued at least for a standby time.

5. The accelerator pedal system according to claim 4, wherein the controller is further configured to switch to the override mode without resuming the locked state, when the pedal opening degree becomes equal to or larger than the override start opening degree before the standby time elapses.

6. The accelerator pedal system according to claim 4, wherein the lock mechanism includes a locking member movably disposed within an accommodation chamber fixed relative to a pedal housing.

* * * * *